(12) United States Patent
Dietrich et al.

(10) Patent No.: US 11,777,743 B2
(45) Date of Patent: Oct. 3, 2023

(54) METHOD FOR SECURELY PROVIDING A PERSONALIZED ELECTRONIC IDENTITY ON A TERMINAL

(71) Applicant: Bundesdruckerei GMBH, Berlin (DE)

(72) Inventors: Frank Dietrich, Berlin (DE); Marian Margraf, Werder (DE); Tim Ohlendorf, Berlin (DE); Matthias Schwan, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 256 days.

(21) Appl. No.: 17/421,079

(22) PCT Filed: Jan. 8, 2020

(86) PCT No.: PCT/DE2020/100006
§ 371 (c)(1),
(2) Date: Jul. 7, 2021

(87) PCT Pub. No.: WO2020/143877
PCT Pub. Date: Jul. 16, 2020

(65) Prior Publication Data
US 2022/0116230 A1   Apr. 14, 2022

(30) Foreign Application Priority Data
Jan. 8, 2019   (DE) ..................... 10 2019 100 335.0

(51) Int. Cl.
H04L 9/32   (2006.01)
H04L 9/08   (2006.01)
H04L 9/30   (2006.01)

(52) U.S. Cl.
CPC .......... H04L 9/3268 (2013.01); H04L 9/0825 (2013.01); H04L 9/3073 (2013.01)

(58) Field of Classification Search
None
See application file for complete search history.

(56) References Cited

U.S. PATENT DOCUMENTS

| 9,397,980 B1 * | 7/2016 | Chen ..................... G06F 21/33 |
| 2013/0086642 A1 * | 4/2013 | Resch .................... H04L 9/321 726/4 |

(Continued)

FOREIGN PATENT DOCUMENTS

| CN | 105701372 B | * | 4/2019 | |
| EP | 3145114 A1 | * | 3/2017 | ........... H04L 9/0844 |

(Continued)

OTHER PUBLICATIONS

Wikipedia. "Security Assertion Markup Language—Wikipedia", Aug. 28, 2016, Retrieved from the Internet: https/;en.widipedia.org/w/index.php?title=Security_Assertion_Markup_Language&oldid=736544308, XP055417859.

(Continued)

*Primary Examiner* — Benjamin E Lanier
(74) *Attorney, Agent, or Firm* — Harness, Dickey & Pierce, P.L.C.

(57) ABSTRACT

The invention relates to a method for securely providing a personalized electronic identity on a terminal (2) which can be used by a user (1) for identification purposes when claiming an online service. In the method, an identification application is ran on a terminal (2), which is assigned to a user (1), in a system comprising data processing devices (9; 10; 11; 12) and said terminal (2), and additionally a personalization application and an identity provider application are ran. The method has the following steps in particular; transmitting a request to transmit an identity attribute assigned to the user (1) front the personalization application to the identity provider application; transmitting the identity attribute from the identity provider application to the personalization application after an agreement to transmit the identity attribute by means of the identity provider application is received from the user (1); generating an asymmetric key pair with a public and a private key on the terminal (2) by means of the identification application; transmitting the public-key from tire identification application on the terminal (2) to the personalization application; and generating an electronic certificate for the public-key by means of tire personalization application and storing the electronic certificate in a data storage device in order to form a first public-key infrastructure of the personalization application, (Continued)

additionally having the steps of: generating a hash value for the identity attribute and recording the hash value onto the electronic certificate. The identity attribute is encoded and transmitted together with the electronic certificate from the personalization application to the identification application (14) on the terminal (2), where both are stored in a local storage device of the terminal (2).

9 Claims, 8 Drawing Sheets

(56) References Cited

U.S. PATENT DOCUMENTS

| | | | |
|---|---|---|---|
| 2013/0191884 A1* | 7/2013 | Leicher | H04W 12/069 726/4 |
| 2013/0311771 A1 | 11/2013 | Hoggan | |
| 2015/0220917 A1 | 8/2015 | Aabye et al. | |
| 2015/0294313 A1 | 10/2015 | Kamal et al. | |
| 2018/0191695 A1 | 7/2018 | Lindemann | |
| 2019/0130398 A1* | 5/2019 | Brown | H04L 9/0825 |

FOREIGN PATENT DOCUMENTS

| | | | | |
|---|---|---|---|---|
| WO | WO-2013151752 A1 | | 10/2013 | |
| WO | WO-2017167741 A1 | * | 10/2017 | H04L 9/0825 |

OTHER PUBLICATIONS

International Search Report and Written Opinion of the International Searching Authority, issued in PCT/DE2020/100006, dated May 26, 2020; ISA/EP.

* cited by examiner

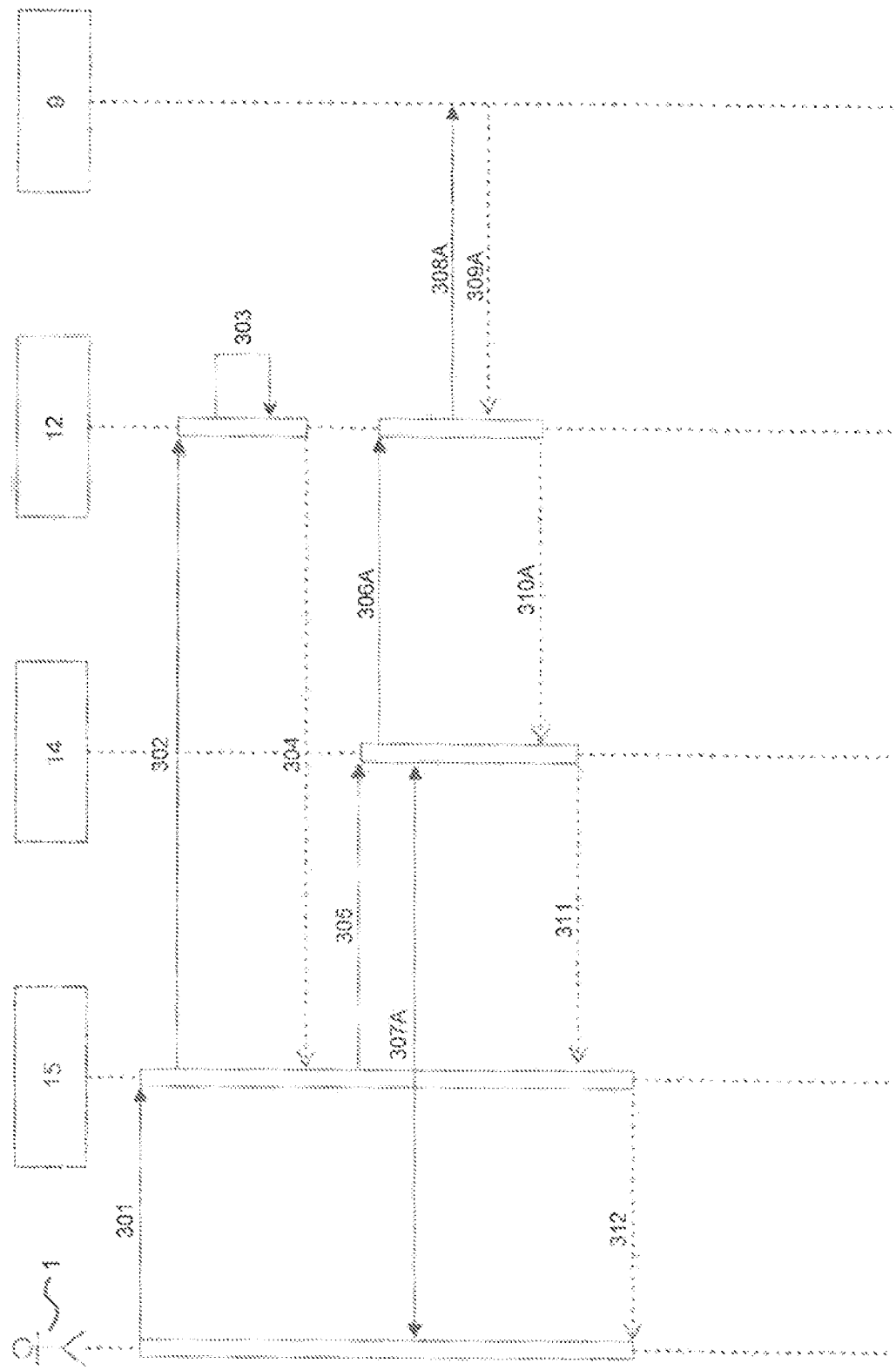

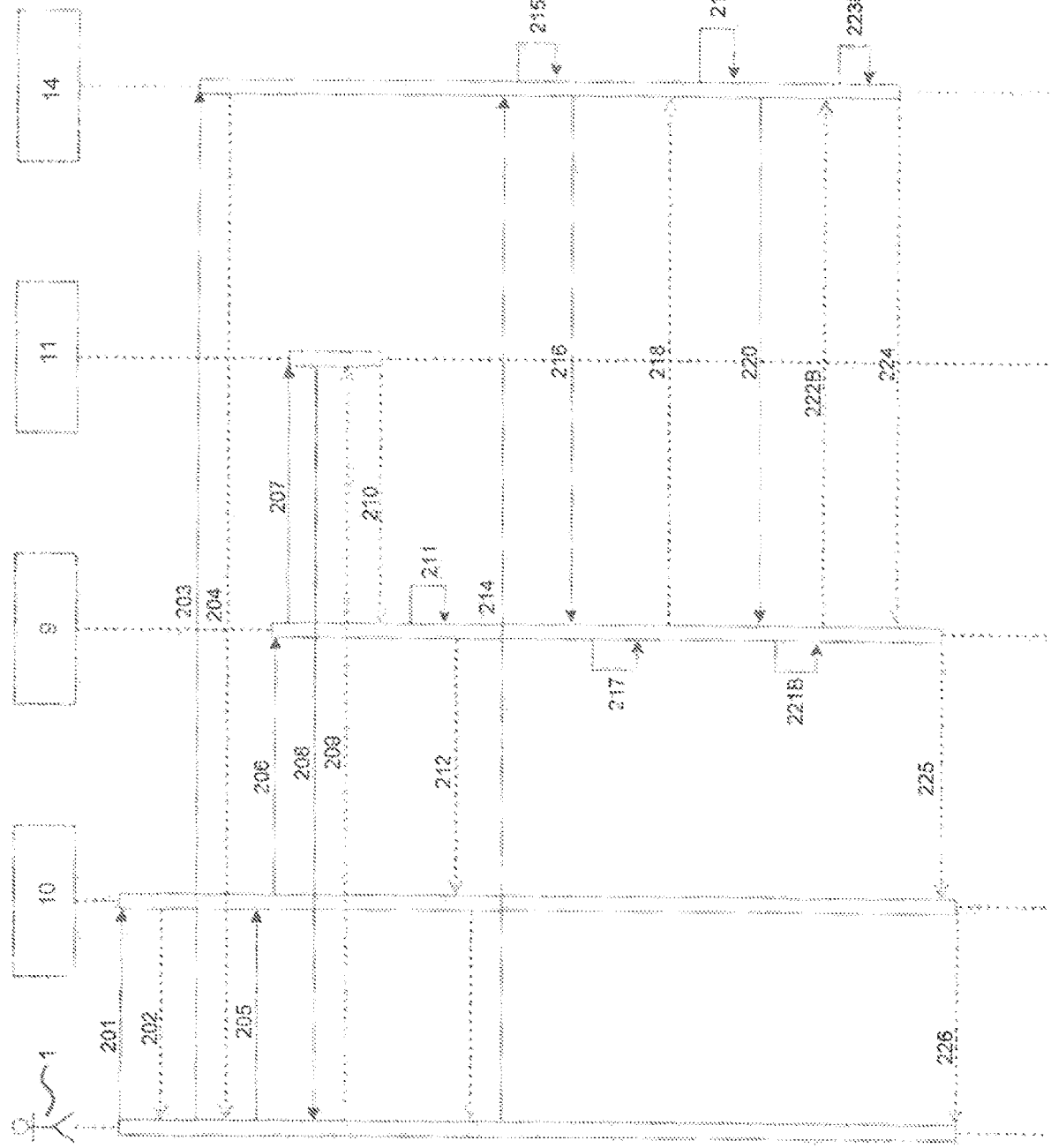

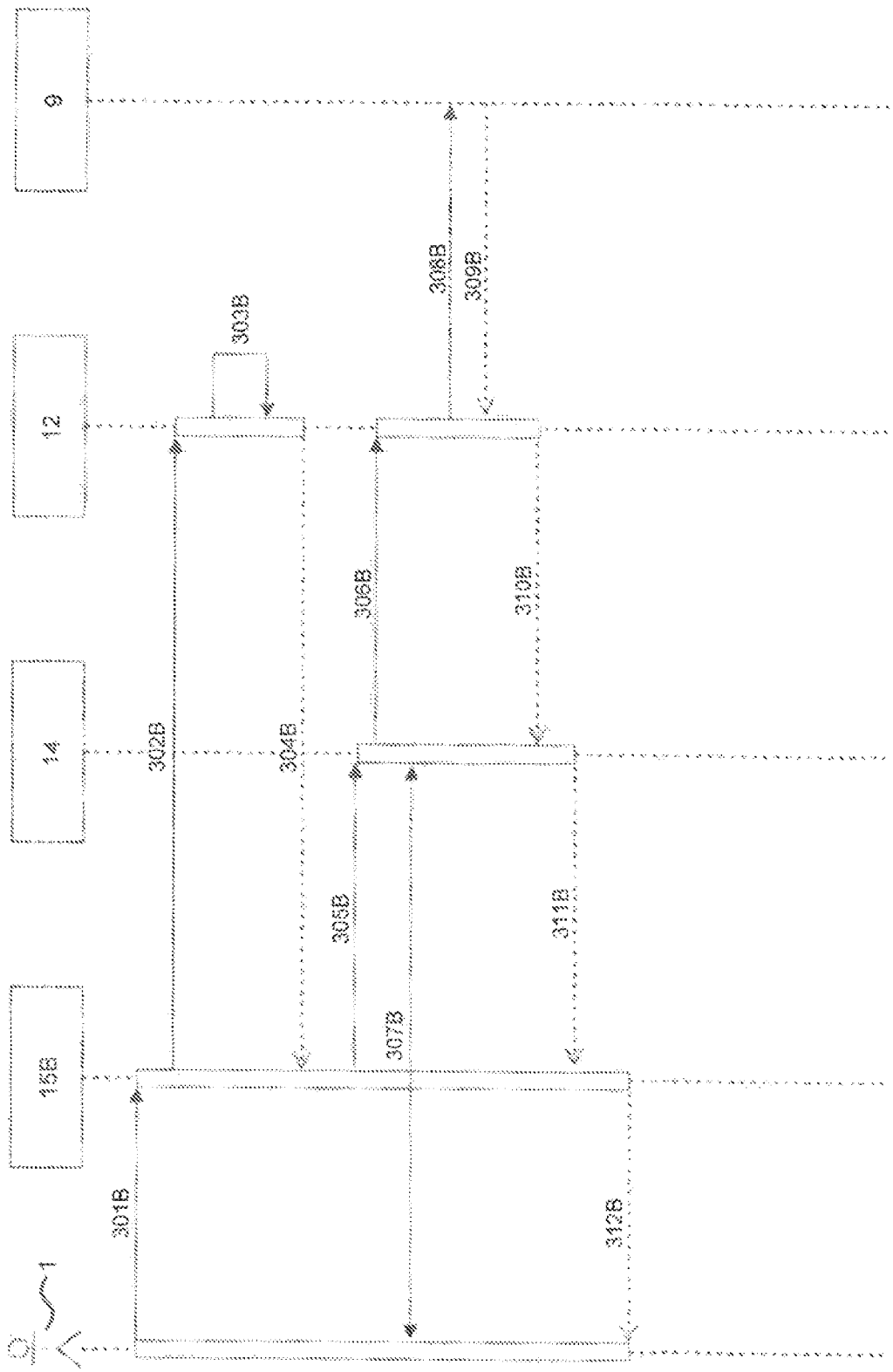

METHOD FOR SECURELY PROVIDING A PERSONALIZED ELECTRONIC IDENTITY ON A TERMINAL

CROSS-REFERENCE TO RELATED APPLICATIONS

This application is a 371 U.S. National Stage of International Application No. PCT/DE2020/100006, filed on Jan. 8, 2020, which claims priority to German Application No. 10 2019 100 335.0 filed on Jan. 8, 2019. The entire disclosures of the above applications are incorporated herein by reference.

The invention relates to a method for securely providing a personalized electronic identity on a terminal.

BACKGROUND

A (personalized) electronic identity (eID) or digital identity in the sense of the present application is an electronic means or tool with which a person is authenticated electronically by means of specific identity attributes assigned to the person to demonstrate his own identity, for example, in connection with the claiming of an online or web-based electronic service. The electronic identity can be uniquely assigned to the person or a process. In its simplest form an electronic identity can consist of user name and password. An electronic identity with higher security level can, for example, be built up by means of two-factor authentication via a smartcard and a personal identification number (PIN).

Mobile devices are being increasingly used as evidence of identity, authentication and authorization means for claiming services. In this case, electronic identities of persons on the terminals are primarily used by terminal manufacturers to carry out services of the terminal manufacturers. Third-party providers of online services such as banks however possibly wish to personalize TAN applications (transaction number or one-time password applications) for their users securely in insecure environments (provide electronic identities of the user) and provide them for a use. Known methods and solutions for this are usually service-specific so that multiple use beyond one service is not provided. There are methods which solve the ad-hoc identification problem (first registration) through a central service (identity provider or ID provider). An identity provider is a service provider which creates, administers and delivers electronic identity information of persons. A disadvantage for the use of an identity provider however is that identification requests can in principle enable a tracking of the user by such a central instance.

A system, a device, a method and a machine-readable medium for bootstrapping an authenticator are described in the document US 2018/0 191 695 A1. The method comprises the following: confirming an identity of a user by a first party using a first identity verification technique responsive to the user acquiring a device having an authenticator: generating or collecting initial user verification reference data upon verifying the identity of the user through the first identity verification technique; securely providing the initial user verification reference data or data derived from the initial user verification reference data to the authenticator; the authenticator implementing a second identity verification technique by comparing the initial user verification reference data or data derived from the initial user verification reference data to data collected from the user or data collected from a device provided to the user; and providing proof of a successful verification of the identity of the user to a second party during a registration request of the authenticator to the second party.

The document US 2015/0 294 313 A1 relates to multi-factor authentication techniques that use secure push authentication technology for transactions. The following is provided: receiving, by an assurance platform operating as an authentication service platform, a user authentication request and transaction data from an access control server (ACS), determining an authentication rule, generating a user validation request message, transmitting the user validation request message to a user mobile device, and receiving user authentication data. The assurance platform then validates the user authentication data, transmits a device authentication request, receives a device authentication response signed with a private key of the user, and authenticates the user based on the device authentication response and private key.

SUMMARY

It is the object of the invention to provide a personalized electronic identity of a user on a terminal which allows the user of the terminal a universal authentication by means of the terminal with respect to arbitrary online services.

For the solution a method for securely providing a personalized electronic identity on a terminal is provided in the independent claim 1. Embodiments are the subject matter of dependent subclaims.

According to one aspect, a method for securely providing a personalized electronic identity on a terminal is provided which can be used by a user for identification purposes when claiming an online service, wherein in the method in a system comprising data processing devices and a terminal which is assigned to a user, an identification application is executed on the terminal and furthermore a personalization application and an identity provider application are executed. In the method, the following is provided:

transmitting a request to transmit an identity attribute assigned to the user from the personalization application to the identity provider application;

transmitting the identity attribute from the identity provider application to the personalization application after an agreement to transmit the identity attribute by means of the identity provider application was received from the user;

generating an asymmetric key pair with a public and a private key on the terminal by means of the identification application in response to the receipt of a request to generate the asymmetric key pair in the terminal from the personalization application;

transmitting the public key from the identification application on the terminal to the personalization application;

generating an electronic certificate for the public key by means of the personalization application and storing the electronic certificate to form a first public-key infrastructure of the personalization application in a data storage device, further comprising: generating a hash value for the identity attribute and recording the hash value into the electronic certificate;

encrypting the identity attribute with the public key by the personalization application, transmitting the encrypted identity attribute and the electronic certificate from the personalization application to the identification application on the terminal and decrypting the encrypted identity attribute with the private key and storing the decrypted identity attribute and the electronic certificate as personalized electronic identity of the user in a local storage device of the terminal.

The asymmetric key pair can be generated as a device-related asymmetric key pair in the terminal.

The identification application can be at least partially executed in a further terminal.

The method can furthermore comprise the following: encrypting the electronic certificate with the public key by the personalization application; transmitting the encrypted electronic certificate from the personalization application to the identification application on the terminal and decrypting the encrypted electronic certificate with the private key.

Report information can be generated and transmitted, wherein the following can be provided here: generating first report data by means of the identification application on the terminal which indicate on the storage of the electronic certificate, the provision of the personalized electronic identity in the terminal and transmitting the first report data to the personalization application.

The electronic certificate can be generated as an electronic certificate according to the X.509 standard. X.509 is an ITU-T standard for a public key infrastructure for creating digital or electronic certificates. The X.509 standard was last updated as ISO/IEC 9594-8 in October 2016. The X.509 standard specifies for example the following data types: public key certificate, attribute certificate, certificate revocation list (CRL) and attribute certificate revocation list (ACRL). In electronic communication X.509 certificates can be used in the TLS versions of different transmission protocols, for example when retrieving web pages with the HTTPS protocol or for signing and encrypting data according to the S/MIME standard.

The electronic certificate and the identity attribute can be used as personalized electronic identity for an identification of the user with respect to an online service provider, wherein the following is provided here:
  provision of a service provider application on one of the data processing devices of the system;
  forming a data communication connection between the identification application on the terminal and the service provider application in response to the receipt of a request to use an online service provided via the service provider application by the service provider application;
  transmitting the electronic certificate with the included hash value for the identity attribute as well as the identity attribute from the identification application to the service provider application;
  verifying the electronic certificate for validity by the personalization application after receipt of the electronic certificate from the service provider application;
  calculating a comparison hash value for the identity attribute obtained from the identification application by the service provider application and comparing the comparison hash value with the hash value for the identity attribute from the electronic certificate and
  releasing the online service for the user when the electronic certificate is verified as valid and the comparison hash value corresponds to the hash value.

The data communication connection can be configured as a mutually authenticated data communication connection. The mutually authenticated data communication connection can be configured as a TLS connection. Transport Layer Security (TLS) more widely known under the previous designation Secure Sockets Layer (SSL) is a hybrid encryption protocol for secure data transmission. A certificate-based authentication is provided to form the mutually authenticated data communication, in particular to counteract so-called man-in-the-middle attacks. Alternatively, other protocols such as, for example PACE (Password-Authenticated Connection Establishment) or EAC (Extended Access Control) can also be used.

For the provision and for the configuration of the identification application on the terminal the following can furthermore be provided: installing the identification application on the terminal; starting the identification application in response to a user start input; forming a secure data communication connection between the identification application on the terminal and the personalization application on a first data processing device; generating a further asymmetric key pair by the identification application in the terminal; transmitting the further public key and a device identifier from the identification application on the terminal to the personalization application and generating a preliminary electronic certificate for the further public key which contains the device identifier by the personalization application in the first data processing device.

Furthermore, the following can additionally be provided here: encrypting the preliminary electronic certificate with a first public key by the personalization application and transmitting the encrypted preliminary electronic certificate to the identification application on the terminal; and decrypting the encrypted preliminary electronic certificate with the first private key by the identification application and storing the preliminary electronic certificate in the storage device of the terminal.

After storage of the preliminary electronic certificate, the device identifier can be output to the user, for example, via a display of the terminal. The user can be informed that the preparation and configuring (set-up) of the identification application has been successfully completed, either by means of an audio or a video output (image data).

According to a further aspect, a method for securely providing a personalized electronic identity on a terminal is provided which can be used by a user for identification purposes when claiming an online service. In the method in a system comprising data processing devices and a terminal which is assigned to a user, an identification application is executed on the terminal and furthermore a registration application, a personalization application and an identity provider application are executed. The method in this case comprises the following:
  receiving a request for registering the identification application by the registration application;
  receiving a device identifier which uniquely identifies the terminal by the registration application from the terminal which has previously received the device identifier within the framework of a user input;
  transmitting a request to transmit an identity attribute assigned to the user from the personalization application to the identity provider application;
  transmitting the identity attribute from the identity provider application to the personalization application after an agreement to transmit the identity attribute by means of the identity provider application was received from the user;
  generating a scannable code by means of the registration application, wherein the scannable code comprises a nonce which is encrypted with a first public key which is part of a first asymmetric key pair which is generated by means of the identification application on the terminal and is formed by the first public key and a first private key;

transmitting the scannable code to and outputting the scannable code by the registration application;

scanning the scannable code and decrypting the nonce by means of the first private key by the identification application and forming a mutually authenticated data communication connection between the identification application on the terminal and the personalization application which is executed in a first data processing device.

In the method using the mutually authenticated data communication connection produced for data transmission between the identification application and the personalization application, the following is furthermore provided:

transmitting the decrypted nonce from the identification application on the terminal to the personalization application and verifying the nonce for validity by the personalization application;

generating a second asymmetric key pair with a second public key and a second private key by the identification application on the terminal in response to the receipt of a request for generating the second asymmetric key pair in the terminal from the personalization application;

transmitting the second public key from the identification application on the terminal to the personalization application;

generating an electronic certificate for the second public key by the personalization application and storing the electronic certificate to form a public-key infrastructure of the personalization application in a data storage device;

encrypting the identity attribute with the second public key by the personalization application;

transmitting the encrypted identity attribute and the electronic certificate from the personalization application to the identification application on the terminal and decrypting the encrypted identity attribute with the second private key and storing the decrypted identity attribute and the electronic certificate as personalized electronic identity in a local storage device of the terminal.

The proposed method in its various embodiments enables the provision of a personalized electronic identity on any user terminals. The method can be implemented free from any exchange of a cryptographic secret, in particular between the terminal and the personalization application. Such a (common) secret designates in cryptography a secret which is only known to the parties involved in the communication. The common secret can, for example, be a password, a passphrase, a large number or a row of randomly generated bytes. Nevertheless, a secure provision of a personalized electronic identity on the terminal in an insecure environment is supported with the proposed method. The personalized electronic identity provided on the terminal can then be used by the user to prove his identity for arbitrary online services.

The terminal can be a mobile terminal such as mobile telephone or laptop computer or a stationary terminal, for example, a desktop personal computer.

The data processing devices in the various embodiments each have one or more processors for processing electronic data and an assigned data storage device. The data exchange can comprise a wireless data exchange and optionally in addition a wired data exchange.

In these or other embodiments, the registration application, the personalization application and/or the identity provider application can in particular each serve to provide the functionalities in conjunction with the personalization of the electronic identity to be provided on the terminal. After the personalization the user of the terminal can use the personalized electronic identity provided thereon in order to identify himself for the claiming of an online service, i.e. prove his identity. The applications provided as software applications can each be implemented on separate data processing devices. Alternatively several applications can be installed on a common data processing device.

In order to form the mutually authorized data communication connection, a certificate-based authentication is provided, in particular in order to counteract so-called man-in-the-middle attacks.

In the meaning used here the designation nonce (abbreviation for: "used only once" or "number used once") relates to a number and/or letter combination which is used only once in the respective context. It can be provided that each nonce is used only once. Typical possibilities to generate a nonce are the use of (cryptographically secure) random values or pseudorandom values which are sufficiently large so that the probability of a double usage is negligibly small (e.g. date of birth paradox) or the use of a counter. The nonce can also include a time stamp and/or a time-dependent value.

If in the course of the method when verifying the nonce by the personalization application, it is established that the nonce is not valid, the further procedure for provision of the personalized electronic identity on the terminal is prevented, for example, by interruption. In particular, the request for generating the second asymmetric key pair in the terminal is only made when validity has been established.

Furthermore, at least one of the following steps can be provided: executing the registration application in a second data processing device and executing the identity provider application in a third data processing device wherein the second and/or the third data processing device are formed separate from the first data processing device.

The first and/or the second asymmetric key pair can be generated in a terminal as a device-related asymmetric key pair. In this case, it can be provided that the private key of the asymmetric key pair generated in the terminal is stored in the terminal itself and prevents the private key leaving the terminal, i.e. not being transmitted from this to other devices or data processing devices.

In response to the request for registering the identification application, the following can furthermore be provided: receiving additional identity information assigned to the user by the registration application from the terminal which has received the additional identity information previously within the framework of a further user input; and transmitting the additional identity information from the registration application to the personalization application in the first data processing device. The electronic certificate for the second public key can be generated by the personalization application comprising the additional identity information as a further identity attribute.

The identification application can be executed at least partially in a further terminal. The further terminal can be a mobile terminal such as a mobile telephone or laptop computer or a stationary terminal, for example, a desktop personal computer. It can be provided that the request for registration of the identification application is received by the further terminal. Alternatively or additionally the user input can be received on the further terminal. The scannable code can be output via an output device, for example, a display on the further terminal. The can then scan the output code by means of the terminal, i.e. read by means of a scanning device of the terminal, as is known per se in various embodiments of optical scanning processes.

It can be provided that report information are generated and transmitted, wherein the following is provided: generating first report data by means of the identification application on the terminal which indicate on the storage of the electronic certificate, the provision of the personalized electronic identity in the terminal; and transmitting the first report data to the personalization application. In a comparable manner, the personalization application can then inform the registration application and this can inform the user with corresponding report data relating to the successful and completed provision of the personalized electronic identity in the terminal.

Before receiving the request for registering the identification application, the following can be provided for providing and for configuring the identification application on the terminal:
    installing the identification application on the terminal;
    starting the identification application in response to a user start input;
    forming a secure data communication connection between the identification application on the terminal and the personalization application on the first data processing device;
    generating the first asymmetric key pair by the identification application in the terminal;
    transmitting the first public key and the device identifier from the identification application on the terminal to the personalization application and
    generating a preliminary electronic certificate for the first public key which contains the device identifier by the personalization application in the first data processing device.

Optionally in this case the following can additionally be provided: encrypting the preliminary electronic certificate with the first public key by the personalization application and transmitting the encrypted preliminary electronic certificate to the identification application on the terminal; and decrypting the encrypted preliminary electronic certificate with the first private key by the identification application and storing the preliminary electronic certificate in the local storage device of the terminal.

After storage of the preliminary electronic certificate, the device identifier can be output to the user, for example, via a display of the terminal. The user can also be informed that the provision and the configuring (set-up) of the identification application has been successfully completed, either by means of an audio or a video output (image data).

The one or more mutually authenticated data communication connections can be configured as a TLS connection.

In the method the following can furthermore be provided in these embodiments: generating a hash vale for the further identity attribute and recording the hash value as an additional attribute in the electronic certificate.

In these embodiments, it can also be provided that the electronic certificate is used as personalized electronic identity for an identification of the user with respect to an online service provider, wherein the following is provided here:
    providing a service provider application on one of the data processing devices of the system;
    forming a further mutually authenticated data communication connection between the identification application on the terminal and the service provider application in response to the receipt of a request for using an online service provided via the service provider application by the service provider application;
    transmitting the electronic certificate with the included hash value for the identity attribute from the identification application to the service provider application;
    verifying the electronic certificate for validity by the personalization application after receipt of the electronic certificate from the service provider application;
    calculating a comparison hash value for the identity attribute obtained from the identification application by the service provider application and comparing the comparison hash value with the hash value for the identity attribute in the electronic certificate and
    releasing the online service for the user when the electronic certificate is verified as valid and the comparison hash value corresponds to the hash value.

In the various embodiments of the method, the following can be provided: generating a hash value for the identity attribute by the personalization application; generating a third key pair assigned to the personalization application and a second public-key infrastructure comprising a third public key and a third private key as well as an electronic certificate for the third public key; generating, by means of the third private key, digital signatures of the hash value for the identity attribute and the electronic certificate for the second public key by the personalization application; and generating a logical data structure by the personalization application. The logical data structure comprises the following: the hash value for the identity attribute; a hash value for the electronic certificate for the second public key; the electronic certificate for the second public key and the digital signature of the electronic certificate for the second public key and the hash values for the identity attribute and for the electronic certificate for the second public key. Furthermore, the following steps are provided: encrypting the logical data structure, the electronic certificate for the second public key and the electronic certificate for the third public key with the second public key by the personalization application; transmitting the encrypted logical data structure, the electronic certificate for the second public key as encrypted certificate and the encrypted electronic certificate for the third public certificate from the personalization application to the identification application on the terminal; and decrypting the logical data structure, the electronic certificate for the second public key and the electronic certificate for the third public key with the second private key and storing in the local storage device of the terminal. Alternatively an encryption of the electronic certificates can be dispensed with. For example, only the electronic data structure can be encrypted and then transmitted as encrypted electronic data structure whilst the electronic certificate or certificates are transmitted unencrypted from the personalization application to the identification application on the terminal.

Furthermore, it can be provided that when generating the logical data structure a digital signature of the logical data structure is generated.

It can be provided that the electronic certificate for the second public key together with the electronic certificate for the third public key is used as personalized electronic identity for an identification of the user with respect to an online service provider, wherein the following is provided here: providing a service provider application on one of the data processing devices of the system; forming a further mutually authenticated data communication connection between the identification application on the terminal and the service provider application in response to the receipt of a request for using an online service provided via the service provider application by the service provider application; transmitting the logical data structure with the hash value included for the identity attribute as well as the identity attribute from the identification application to the service provider application; verifying, by the personalization application, the validity of the electronic certificate ($Cert_{IP\_app}$) for the second public key by means of the first public key infrastructure ($PKI_{2,1}$) and the electronic certificate t ($Cert_{Perso\_ident}$) for the third public key by means of the second public-key infrastructure ($PKI_{2,2}$); calculating a comparison hash value for the identity attribute obtained from the identification application by the service provider application and comparing the comparison hash value with the hash value for the identity attribute in logical data structure and releasing the online service for the user. The release is accomplished when the following is given: the comparison hash value corresponds to the hash value; the electronic certificate for the second public key is contained in the logical data structure; and the electronic certificate for the second public key and the electronic certificate for the third public key are each verified as valid.

Furthermore it can be provided that the online service is only released for the user when additionally the digital signature of the logical data structure is verified and/or the electronic certificate for the third public key is contained in the logical data structure.

In the various embodiments of the method, the following can furthermore be provided: generating a key pair from a fourth public key and a fourth private key which is assigned to a third public-key infrastructure and an electronic certificate for a fourth public key by the personalization application; generating a digital signature of the electronic certificate for the fourth public key by means of the private key assigned to the second public-key infrastructure by the personalization application; extending the logical data structure by the personalization application so that the logical data structure also comprises the following: the electronic certificate for the fourth public key and the digital signature of the electronic certificate for the fourth public key; encrypting the electronic certificate for the fourth public key and the fourth private key with the second public key by the personalization application; transmitting the encrypted electronic certificate for the fourth public key and the encrypted fourth private key from the personalization application to the identification application on the terminal; and decrypting the encrypted electronic certificate for the fourth public key and the encrypted fourth private key with the second private key and storing in the local storage device of the terminal. Alternatively in this case an encryption of the electronic certificate or the electronic certificate can be dispensed with. For example, only the electronic data structure can be encrypted.

In this case, it can be provided that when extending the logical data structure a digital signature of the logical data structure is generated.

It can also be provided that the electronic certificate for the second public key together with the electronic certificate for the third public key and the electronic certificate for the fourth public key is used as personalized electronic identity for an identification of the user with respect to an online service provider, wherein the following is provided here: providing a service provider application on one of the data processing devices of the system; forming a further mutually authenticated data communication connection between the identification application on the terminal and the service provider application in response to the receipt of a request for using an online service provided via the service provider application by the service provider application; transmitting the logical data structure with the hash value included for the identity attribute as well as the identity attribute from the identification application to the service provider application; verifying, by the personalization application, the validity of the electronic certificate ($Cert_{IP\_app}$) for the second public key by means of the third public key infrastructure ($PKI_{3,1}$) of the electronic certificate ($Cert_{Perso\_ident}$) for the third public key by means of the first public-key infrastructure ($PKI_{3,2}$) as well as of the electronic certificate ($Cert_{ID\_TLS\_client}$) for the fourth public key by means of the second public-key infrastructure ($PKI_{3,3}$); calculating a comparison hash value for the identity attribute obtained from the identification application by the service provider application and comparing the comparison hash value with the hash value for the identity attribute in the logical data structure and releasing the online service for the user. The release is accomplished when the following is given: the comparison hash value corresponds to the hash value; the digital signature of the logical data structure is verified; the electronic certificate ($Cert_{IP\_app}$) for the second public key and the electronic certificate ($Cert_{ID\_TLS\_client}$) for the fourth public key are contained in the logical data structure; and the electronic certificate ($Cert_{IP\_app}$) for the second public key and the electronic certificate for the fourth public key ($Cert_{ID\_TLS\_client}$) are each verified as valid.

It can furthermore be provided that the online service is only released for the user when additionally the electronic certificate ($Cert_{Perso\_ident}$) for the third public key is contained in the logical data structure.

In one embodiment, a system with data processing devices and a terminal assigned to the end user are provided in which an identification application on the terminal and furthermore a personalization application as well as an identity provider application are installed and implemented, wherein the system is set up by means of the applications to execute the method for securely providing a personalized electronic identity on the terminal. With regard to possible embodiments, the explanations explained hereinbefore in connection with the method apply accordingly.

Furthermore, a computer program product can be provided which contains program code or instructions which is adapted when loaded in a system of data processing devices to execute the method for securely providing a personalized electronic identity on the terminal and/or the use of the electronic identity.

DESCRIPTION OF EXEMPLARY EMBODIMENTS

Hereinafter further exemplary embodiments are explained in detail with reference to figures of a drawing. In the figures here:

FIG. 6 shows a schematic diagram for identification and/or authentication by means of the electronic identity with respect to an online service using two public-key infrastructures;

FIG. 7 shows a schematic diagram for a method for providing the electronic identity on the terminal using three public key infrastructures;

FIG. 8 shows a schematic diagram for identification and/or authentication by means of the electronic identity with respect to an online service using three public-key infrastructures.

FIG. 1 shows a schematic diagram of a system with terminals of a user 1 and data processing devices for providing and for using a (personalized) electronic identity which is stored on one of the terminals in a data storage device. The electronic identity is finally personalized, i.e. assigned to the user 1 so that said user can prove his identity herewith for the use of online services.

Figure 1:
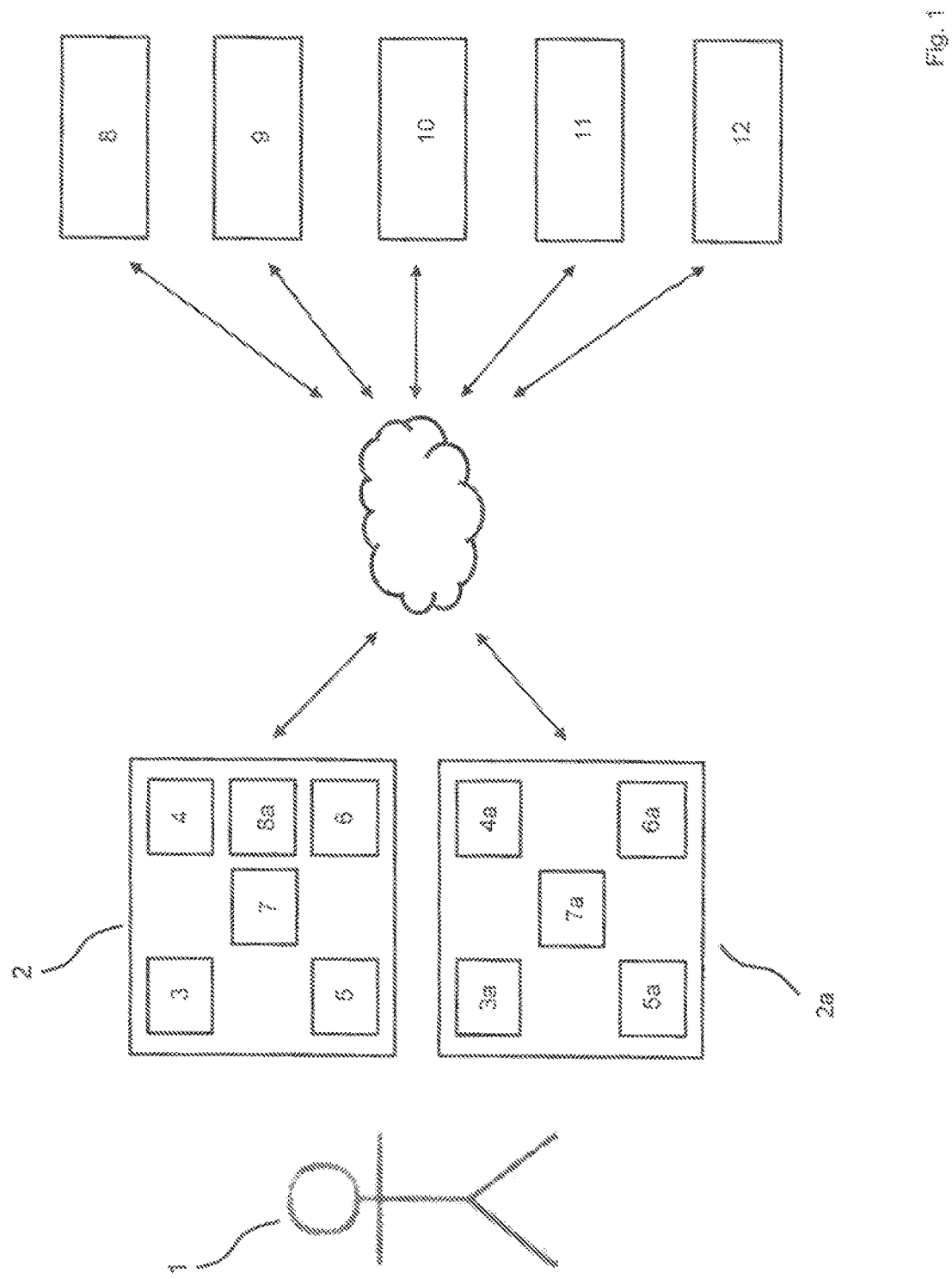
FIG. 1 shows a schematic diagram of terminals of a user and data processing devices for providing and using an electronic identity.

A terminal 2 of the user 1 has an input device 3, an output device 4, a communication device 5 and a data storage device 6, a computing device 7 with at least one processor and a camera 8a. A further terminal 2a of the user 1 has an input device 3a, an output device 4a, a communication device 5a and a data storage device 6a, a computing device 7a with at least one processor. The terminal 2 can, for example, comprise a mobile terminal. The terminal 2a can, for example, comprise a personal computer.

The terminals 2 or 2a can communicate electronically by means of the respective communication device 5 or 5a with an electronic data processing device 8 of a digital platform, an electronic data processing device 9 of a network-based personalization service and an electronic data processing device 10 of a registration website. The data processing device 9 can be configured as a distributed system. It can also be provided that the electronic data processing device 9 and the electronic data processing device 10 constitute the same electronic data processing device. Furthermore, the terminals 2, 2a can communicate electronically with an electronic data processing device 11 of an identity provider as well as with an electronic data processing device 12 of a further online service which can provide arbitrary online services. The electronic data processing devices 8 to 12 can also communicate electronically with one another.

A plurality of software-implemented applications are implemented on the system comprising the terminal or terminals 2, 2a as well as the data processing devices, in particular a registration application (for example, providing the registration website), a personalization application (in particular providing the service of the personalization service) and an identity provider application (in particular providing the service of the identity provider). The applications are used in the processes and methods described hereinafter.

Figure 2:
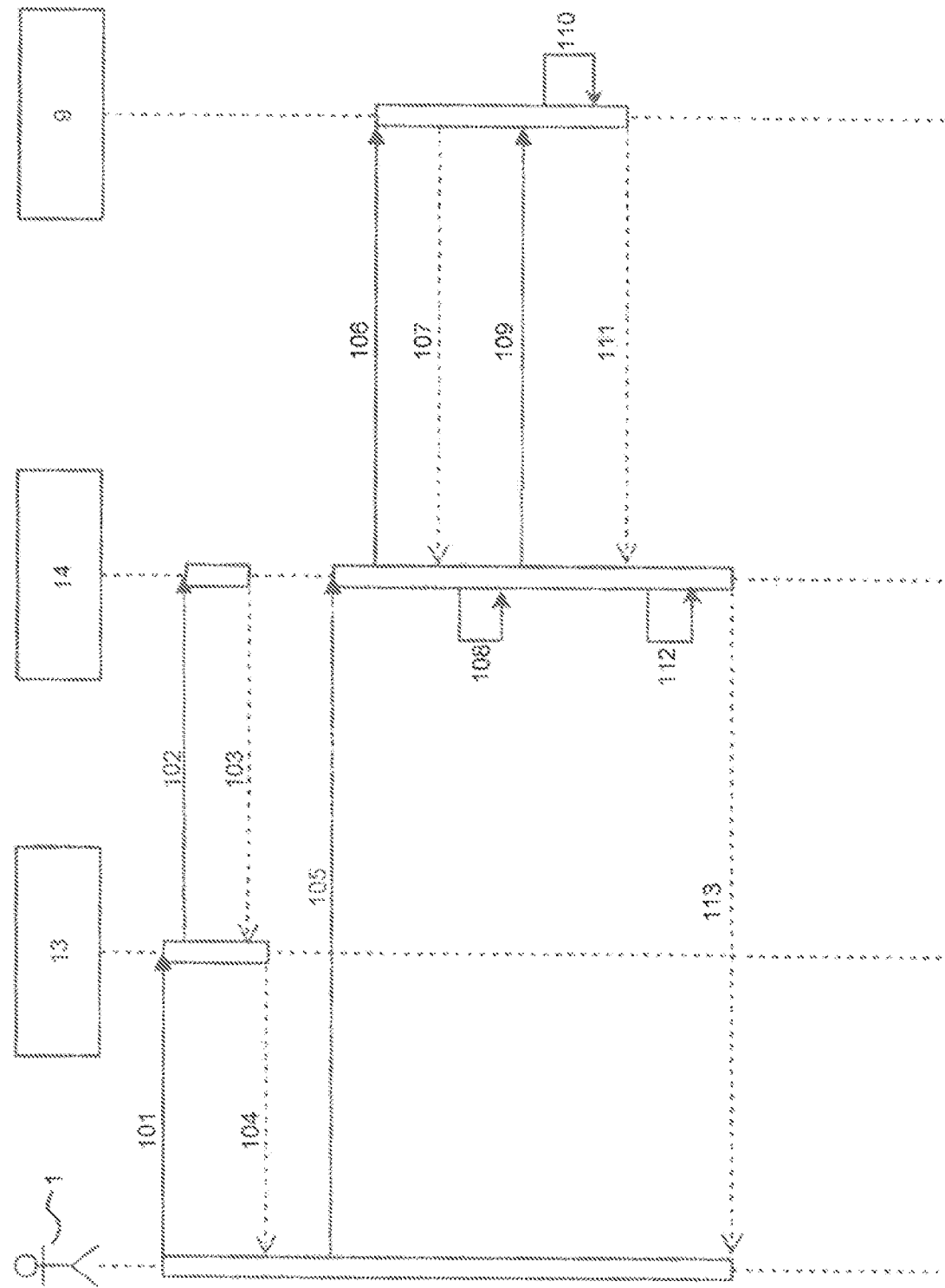
FIG. 2 shows a schematic diagram for providing a software application for an electronic identity on a terminal.

FIG. 2 shows a schematic diagram for providing an identification application 14, which is subsequently also designated for simplicity as software application 14 for an electronic identity on the terminal 2 of the user 1.

Firstly the software application 14 is to be installed in the data storage device 6 of the terminal 2 from a digital platform. The digital platform can, for example, comprise an App store for software applications which after retrieval and installation can be executed on terminals of the user. For this purpose in a first step 101 by means of the input device 3 of the terminal 2 the software application 14 is requested by the user 1 from a software application 13 of the digital platform, which is stored on the data processing device 8 of the digital platform. The software application 13 can be installed on the terminal 2. Then the installation process of the software application 14 is started on the terminal 2 of the user 1 from the software application 13 (step 102).

After completion of the installation of the software application 14 on the terminal 2 of the user 1 (step 103) the software application 13 informs the user 1 of this (step 104). Subsequently the software application 14 starts for the first time (step 105).

The software application 14 makes a secure connection to the data processing device 9 of the personalization service. In order to form the connection in the data processing device 9 a certificate $Cert_{Persoservice}$ of the personalization service is compared with a unique identifier (fingerprint) and hereby verified (certificate pinning, step 106). The fingerprint can, for example, comprise a hash function. The fingerprint is stored in the data storage device 6 of the terminal 2, optionally in encrypted form in such a manner that only the software application 14 can access the fingerprint. The secure connection can, for example, be produced by means of the TLS protocol (transport layer security). Alternatively other protocols such as, for example PACE (Password-Authenticated Connection Establishment) or EAC (Extended Access Control) can be used for the secure connection.

The data processing device 9 of the personalization service then requests the software application 14 to generate a device-bound asymmetric first key pair ($pk_{ID\_prov}$, $sk_{ID\_prov}$) with a public key $pk_{ID\_prov}$ and a private key $sk_{ID\_prov}$ (step 107).

In the following step 108 the first key pair ($pk_{ID\_prov}$, $sk_{ID\_prov}$) is generated by the software application 14. Then the public key $pk_{ID\_prov}$ and a unique device identifier $ID_{app}$ are sent to the data processing device 9 (step 109). The device identifier $ID_{app}$ in the sense of the technology described here is unique insofar as it serves as unique (only allocated once) device identifier within the framework of the service provided by the personalization service.

In step 110 the data processing device 9 generates a digital certificate $Cert_{ID\_app\_prov}$ based on a public key $pk_{ID\_prov}$ and stores the certificate $Cert_{ID\_app\_prov}$ in an internal database. Here in particular this can comprise a certificate in accordance with the X.509-v3 standard. Such a certificate comprises a certificate version, a serial number, an algorithm ID, an issuer designation, validity data, certificate owner designations and key information, additional extensions and attributes as well as certificate signature algorithm and certificate signature. Furthermore, such a certificate can comprise unique identifiers of issuer and owner. The certificate $Cert_{ID\_app\_prov}$ in particular contains the device identifier $ID_{app}$. Furthermore an encrypted certificate enc ($Cert_{ID\_app\_prov}$, $pk_{ID\_prov}$) is generated by the data processing device 9 by means of the public key $pk_{ID\_prov}$. The data processing device 9 then sends the encrypted certificate enc($Cert_{ID\_app\_prov}$, pk) back to the software application 14 (step 111).

In step 112 the software application 14 decrypts the encrypted certificate enc($Cert_{ID}$, $pk_{ID\_prov}$) with the private key $sk_{ID\_prov}$ so that the certificate $Cert_{ID\_app\_prov}$ is generated and stores the certificate $Cert_{ID\_app\_prov}$ which contains the device identifier $ID_{app}$, in the data storage device 6 of the terminal 2. The software application 14 then indicates that the method has been successfully completed (step 113). For this purpose the software application 14 displays the device identifier $ID_{app}$ on the output device 4 of the terminal 2, for example, a screen. The device identifier $ID_{app}$ can be used, in particular for providing the electronic identity of the user 1, in particular by means of the method described hereinafter.

Figure 3:
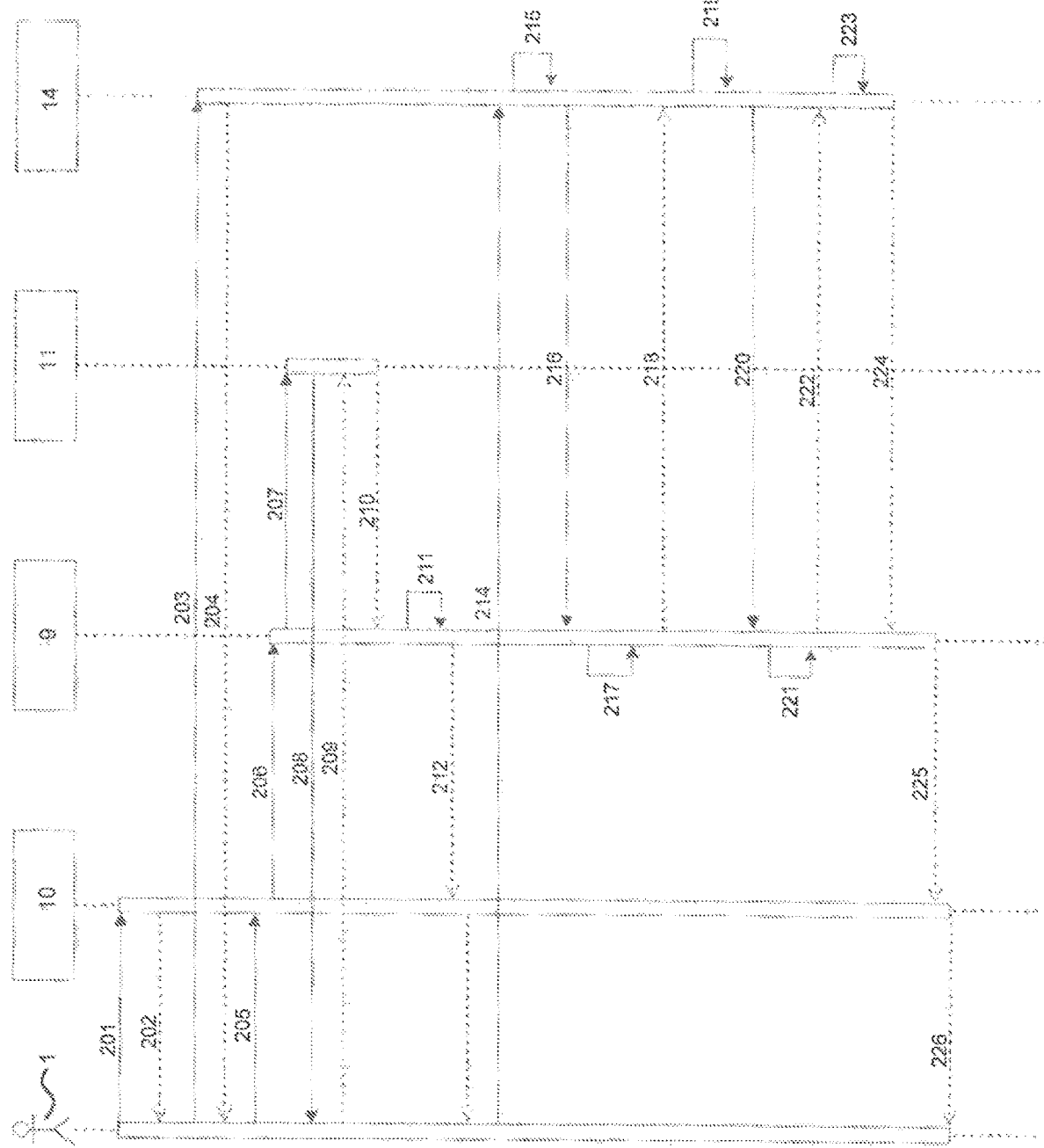
FIG. 3 shows a schematic diagram for a method for providing the electronic identity on the terminal.

FIG. 3 shows a schematic diagram for a method for providing the electronic identity on the terminal 2. By means of the method the electronic identity of the user 1 is registered in the software application 14 already installed on the terminal 2. For this purpose the software application 14 must be provided on the terminal 2.

In a first step 201 a connection to the data processing device 10 is made by the user 1 by means of the input device 3a of the terminal 2a and a website located on the data processing device 10 is called up. The website can be called up, for example, by means of a web browser installed on the terminal 2a. The data processing device 10 then sends to the output device 4a of the terminal 2a a request to the user 1 to open the software application 14 on the terminal 2 (step 202) in order to be able to input the device identifier $ID_{app}$ on the website by means of the input device 3a of the terminal 2a. Furthermore, in step 202 additional information can be requested which can be added to the personalization of the electronic identity. The additional information can, for example, comprise driving license data, ID card data, student number, photos or signatures. In addition, the user 1 is requested in step 202 to search for an assisted identity provider.

In the following step 203 the software application 14 is opened by the user 1 on the terminal 2 in order to obtain access to the device identifier $ID_{app}$. The user 1 reads the device identifier $ID_{app}$ (step 204) and enters all the information requested by the data processing device 10 in step 202 by means of the input device 3a on the website (step 205). The data processing device 10 now sends the information input by the user and the device identifier $ID_{app}$ to the data processing device 9 of the personalization service (step 206). The data processing device 9 of the personalization service requests information attributes $attr_{ID}$ of the user 1 from the data processing device 11 of the identity provider (step 207). Alternatively the feature $attr_{ID}$ can comprise only a single identity attribute. The data processing device 11 of the identity provider then requests a permission of the user 1 to send the identity attributes $attr_{ID}$ to the data processing device 9 of the personalization service (step 208). Here the user 1 can for example use his ID card which can be read by means of a reader for the authorization (granting the permission).

When the user 1 has authorized the data processing device 11 of the identity provider to send the identity attributes $attr_{ID}$ to the data processing device 9 of the personalization service (step 209), the data processing device 11 of the identity provider sends the identity attributes $attr_{ID}$ to the data processing device 9 of the personalization service (step 210). The data processing device 9 of the personalization service then processes the received identity attributes $attr_{ID}$ and adds optional further attributes (step 211), for example, from the information which was input by the user 1 in step 205 by means of the input device 3a in the terminal 2a on the website. Furthermore, in step 211 the data processing device 9 of the personalization service generates a 2D barcode which contains a nonce (a character string to be used once) $nonce_{pers}$ which is encrypted with the public key $pk_{ID\_prov}$ (from the terminal 2, see step 109). The public key is obtained for this purpose from the certificate $Cert_{ID\_app\_prov}$ which contains the device identifier IDapp (cf. step 110). By using nonces to be used once, the security from crypto-analytical attacks is increased. The 2D barcode can, for example, comprise a QR code or an Aztec code. Instead of the 2D barcode, another opto-electronically readable code can also be used, for example, a one-dimensional barcode.

The data processing device 9 of the personalization service then sends the 2D barcode to the data processing device 10 with the website (step 212). The website displays the 2D barcode on the output device 4a of the terminal and further requests the user 1 to scan the 2D barcode by means of the software application 14 on the terminal 2 (step 213). For this purpose the software application 14 accesses the camera 8a of the terminal 2. As soon as the user 1 has scanned the 2D barcode (step 214), the software application 14 decrypts the nonce $nonce_{pers}$ which is contained in the 2D barcode. The decryption is carried out using the private key $sk_{ID\_prov}$ which together with the public key $pk_{ID\_prov}$ forms the first key pair (step 215). The software application 14 then makes a secure mutually authenticated connection to the data processing device 9 (step 216). The connection can be made, for example, by means of TLS, EAC or PACE. To make the connection the software application 14 verifies the certificate $Cert_{persoservice}$ of the personalization service with a fingerprint which is stored with the software application 14 in the data storage device 6 of the terminal 2 (certificate pinning). In addition, the data processing device 9 verifies a certificate $Cert_{ID\_app}$ of the software application 14 by means of an internal database. Furthermore the nonce $nonce_{pers}$ is sent from the software application 14 to the data processing device 9 of the personalization service.

In step 217 it is verified by the data processing device 9 of the personalization service whether the nonce $nonce_{pers}$ is valid. The data processing device 9 then requests the software application 14 to create a device-bound asymmetric second key pair ($pk_{ID\_app}$, $sk_{ID\_app}$) (step 218), whereupon the software application 14 creates the second key pair ($pk_{ID\_app}$, $sk_{ID\_app}$) (step 219). The public key $pk_{ID\_app}$ is sent from the software application 14 to the data processing device 9 (step 220).

In step 221 the data processing device 9 creates a certificate $Cert_{ID\_app}$ for the public key $pk_{ID\_app}$ and stores the certificate $Cert_{ID\_app}$ in a public-key infrastructure (PKI) $PKI_{ident}$. It can be provided that the PKI is distributed over several data processing devices. A PKI comprises a system for issuing, distributing and verifying digital (electronic) certificates. The method described can be executed with (only) a single PKI. Alternatively the use of further PKIs can be provided (cf. in particular below for FIGS. 5 to 8).

The certificate $Cert_{ID\_app}$ can in particular comprise a certificate according to the X.509v3 standard which provides additional attributes within certificates.

The certificate $Cert_{ID\_app}$ can contain hash values of each of the identity attributes $attr_{ID}$ of the user 1 which are calculated by means of a hash function from the identity attributes $attr_{ID}$. In this way, the electronic identity can be provided using a digital certificate which contains hash values for (additional) attributes (identity attributes).

The certificate $Cert_{ID\_app}$ with the hash values of the identity attributes $attr_{ID}$ is encrypted by the data processing device 9 by means of the public key $pk_{ID\_app}$ to form an encrypted certificate $enc(Cert_{ID\_app}, pk_{ID})$ and the identity attributes $attr_{ID}$ are encrypted to form encrypted identity attributes $enc(attr_{ID}, pk_{ID\_app})$. Alternatively it can be provided not to encrypt the certificate $Cert_{ID\_app}$.

The encrypted certificate $enc(Cert_{ID\_app}, pk_{ID\_prov})$ (or alternatively the certificate $Cert_{ID\_app}$) as well as the encrypted identity attributes $enc(attr_{ID}, pk_{ID\_app})$ are sent by the data processing device 9 back to the software application 14 (step 222).

If the certificate $Cert_{ID\_app}$ was encrypted and send encrypted, the software application 14 in step 223 decrypts the encrypted certificate $enc(Cert_{ID\_app}, pk_{ID\_app})$ with the private key $sk_{ID\_app}$. The software application 14 stores the certificate obtained $Cert_{ID\_app}$ in the data storage device 6 on the terminal 2. Furthermore the software application 14 decrypts the encrypted identity attributes $enc(attr_{ID}, pk_{ID\_app})$ with the private key $sk_{ID\_app}$ and stores the decrypted identity attributes $attr_{ID}$ with a device-bound symmetrical key $key_{attr}$ on the data storage device 6 of the terminal 2.

In the following step 224 the software application 14 notifies the personalization service 13 of a successful registration of the electronic identity of the user 1 on the terminal 2. The personalization service 13 notifies the website 20 of the successful registration of the electronic identity of the user 1 on the terminal 2 (step 225). In the final step 226 the data processing device 10 notifies the user 1 via the website of the successful registration of the electronic identity of the user 1 on the terminal 2.

Figure 4:
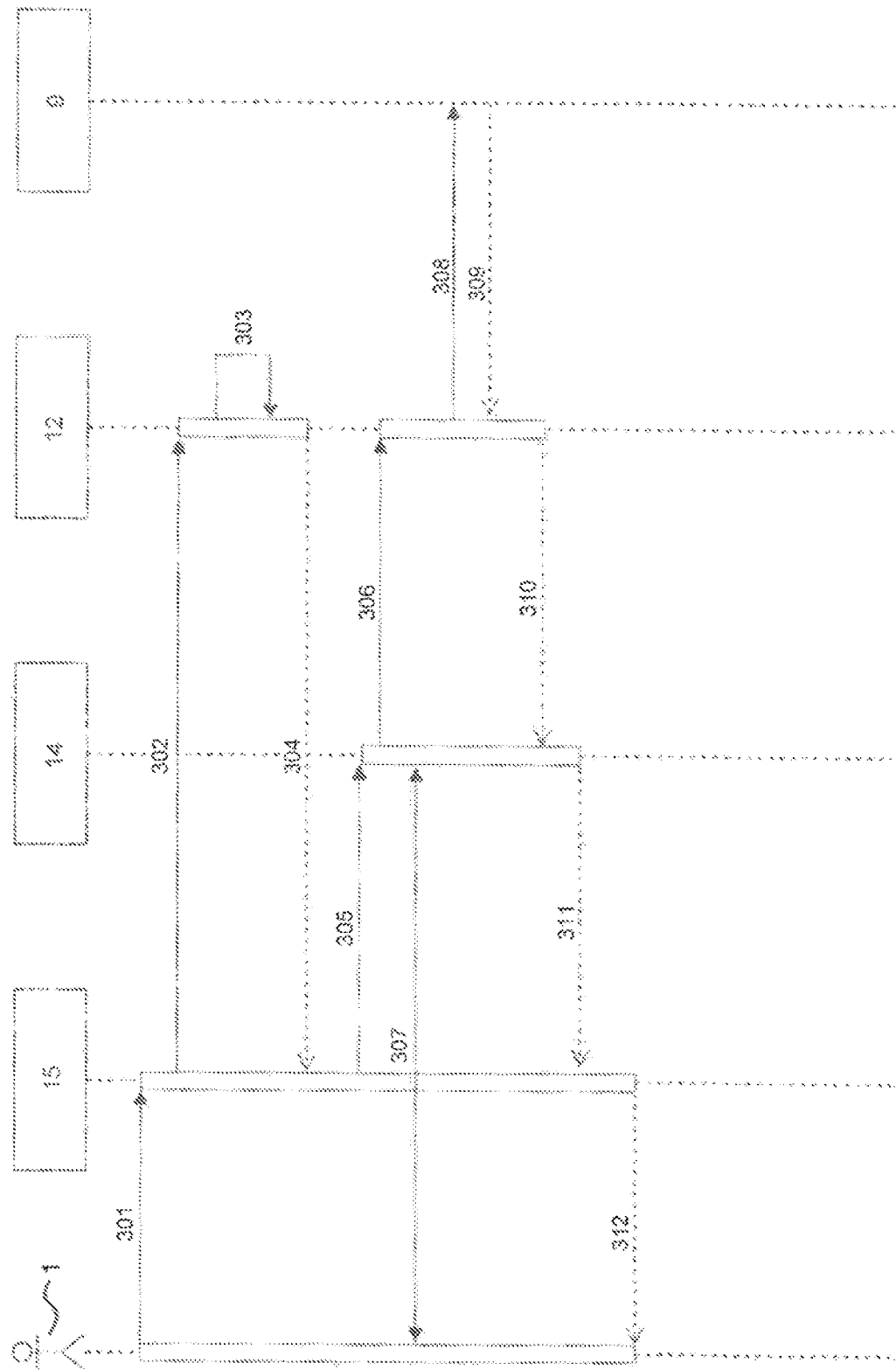
FIG. 4 shows a schematic diagram for identification and/or authentication by means of the electronic identity with respect to an online service.

FIG. 4 shows a schematic diagram for the identification and authentication by means of the electronic identity of the user 1, a web browser 15 of the user 1 and the software application 14 with respect to the data processing device 12 of an online service. The web browser 15 and the software application 14 can be located on the same terminal 2. Alternatively the web browser 15 can be located on a further terminal, for example, the terminal 2a.

In step 301 the user 1 clicks in the web browser 15 on a control on the website of the online service. The web browser 15 then sends a login request to the data processing device 12 of the online service via a secure communication channel (step 302). The secure communication channel can, for example, be produced via TLS. The login request contains the session identifier $ID_{session}$. The identity of the online service is verified by a $Cert_{EV\_service}$. This can in particular comprise an extended validation certificate (EV certificate) according to the X.509 standard which was issued by a certification authority (CA).

The data processing device 12 stores the session identifier $ID_{session}$ and generates an authentication request token $token_{auth\_request}$ (step 303). The authentication request token $token_{auth\_request}$ contains all the information required to execute the authentication with the software application 14. The data processing device 12 sends the authentication request token $token_{auth\_request}$ to the web browser 15 (step 304).

In step 305 when the software application 14 and the web browser 15 are located on the same device, a device-specific custom URL is used to send the authentication request token $token_{auth\_request}$ to the software application 14. The device-specific custom URL can, for example comprise the following: type, method call-up, sequence of attributes, image of the QR code.

If alternatively the software application 14 and the web browser 15 are located on different devices, in step 305 a 2D barcode is displayed in the web browser which contains the authentication request token $token_{auth\_request}$. The 2D barcode is then to be scanned by the user 1 by means of the software application 14 and the camera 8a. Instead of the 2D barcode, another opto-electronically readable code can also be provided.

After the software application 14 has received the authentication request token $token_{auth\_request}$, the software application 14 analyzes the authentication request token $token_{auth\_request}$ and extracts from the authentication request token $token_{auth\_request}$ information of the online service (step 306). The software application 14 verifies the EV certificate $Cert_{EV\_service}$ of the online service and then displays the EV certificate $Cert_{EV\_service}$ and/or essential information on the EV certificate $Cert_{EV\_service}$ to the user 1 on the output device 4 of the terminal 2. By means of the extracted information of the online service, the software application 14 constructs a secure, mutually authenticated connection to the data processing device 12 of the online service. The secure mutually authenticated connection can in particular be configured as a mutual TLS authentication connection (mTLS).

Optionally before step 306 is executed, a connection between the software application 14 and the data processing device 12 can be set up by the software application 14 in order to request and validate the EV certificate $Cert_{EV\_service}$ from the data processing device 12. In this optional embodiment step 306 is only executed after the EV certificate $Cert_{EV\_service}$ has been validated.

With the information extracted from the EV certificate $Cert_{EV\_service}$ via the service, the user 1 can accept the authentication request (step 307). The accepting of the authentication request by the user 1 can be accomplished, for example, in the input device 3 by means of biometric authentication (possibly by means of input of a fingerprint of the user 1) or by means of a predefined user PIN. When the user 1 accepts the authentication request, the certificate $Cert_{ID\_app}$ of the software application 14 and the requested identity attributes $attr_{ID}$ are sent to the data processing device 12 (cf. step 306).

The data processing device 12 then sends a certificate validity request for the certificate $Cert_{ID\_app}$ to the data processing device 9 of the personalization service (step 308). The data processing device 9 checks by means of the PKI $PKI_{ident}$ (cf. step 221) the validity of the certificate $Cert_{ID\_app}$ and returns the result of the verification of the validity of the certificate $Cert_{ID\_app}$ to the data processing device 12 (step 309).

The data processing device 12 of the online service now checks whether the sent identity attributes $attr_{ID}$ are valid (step 310). This check is made by calculating hash values from the identity attributes $attr_{ID}$ by means of a hash function and comparing the calculated hash values with the hash values of the identity attributes $attr_{ID}$ stored in the certificate $Cert_{ID\_app}$. In particular, the hash function can comprise the same hash function as in step 221. If the calculated hash values agree with the hash values stored in the certificate $Cert_{ID\_app}$, a URI (Uniform Resource Identifier) is sent by the data processing device 12 to the software application 14. If the hash values do not agree the process is interrupted.

The explained authentication sequence can be provided for data protection reasons. In this case, the authentication of the data processing device 12 of the online service (here the server) firstly takes place by means of the certificate $Cert_{EV\_service}$, then the authentication of the software application 14 (here the client) by means of the certificate $Cert_{ID\_app}$. Thus, in this possible embodiment it can be avoided that personal data such as the hash values of the identity attributes $attr_{ID}$ in the certificate $Cert_{ID\_app}$ are sent to a non-authorized server. Such a thing does not take place.

If the URI was sent from the data processing device 12 to the software application 14, the software application 14 transfers the URI together with the session identifier $ID_{session}$ to the web browser 15 (step 311). The web browser 15 then loads the received URI (step 312). Thus, the identification and authentication by means of the electronic identity is completed.

In further exemplary embodiments, instead of one PKI $PKI_{ident}$ several publicly accessible PKIs can be used. In particular two different PKIs $PKI_{2,1}$, $PKI_{2,2}$ and three different PKIs $PKI_{3,1}$, $PKI_{3,2}$, $PKI_{3,3}$ can be used. As a result of the distribution of individual steps over different PKIs, data protection can be improved in particular with regard to the potential trackability of the user 1 since only absolutely necessary personal data (personal identifiable information PII) are available when setting up the communication. Furthermore, when using several PKIs, different private keys can be used which can be stored in different key storage devices of the terminal 2. The extraction of several private keys when using several PKIs means a potentially higher effort for an attacker and therefore results in increased security.

The steps for providing the electronic identity and for identification and authentication by means of the electronic identity which differ from the method with the only one PKI $PKI_{ident}$ are set out in detail hereinafter: steps relating to the method with the two PKIs $PKI_{2,1}$, $PKI_{2,2}$ are here characterized by the suffix "A". Steps relating to the method with the three PKIs $PKI_{3,1}$, $PKI_{3,2}$, $PKI_{3,3}$ are characterized by the suffix "B". The PKIs can be stored on the data processing device 9.

The steps 101 to 113 for providing the software application 14 for an electronic identity on the terminal 2 as well as the steps 201 to 220 for providing the electronic identity on the terminal 2 are carried out with several PKIs as for a single PKI.

The previously described method uses (only) one PKI (Public-Key Infrastructure). Hereinafter exemplary embodiments are explained with reference to FIGS. 5 to 8 in which several PKIs are used, in particular two, as well as the PKI, i.e. one or two additional PKIs.

Figure 5:
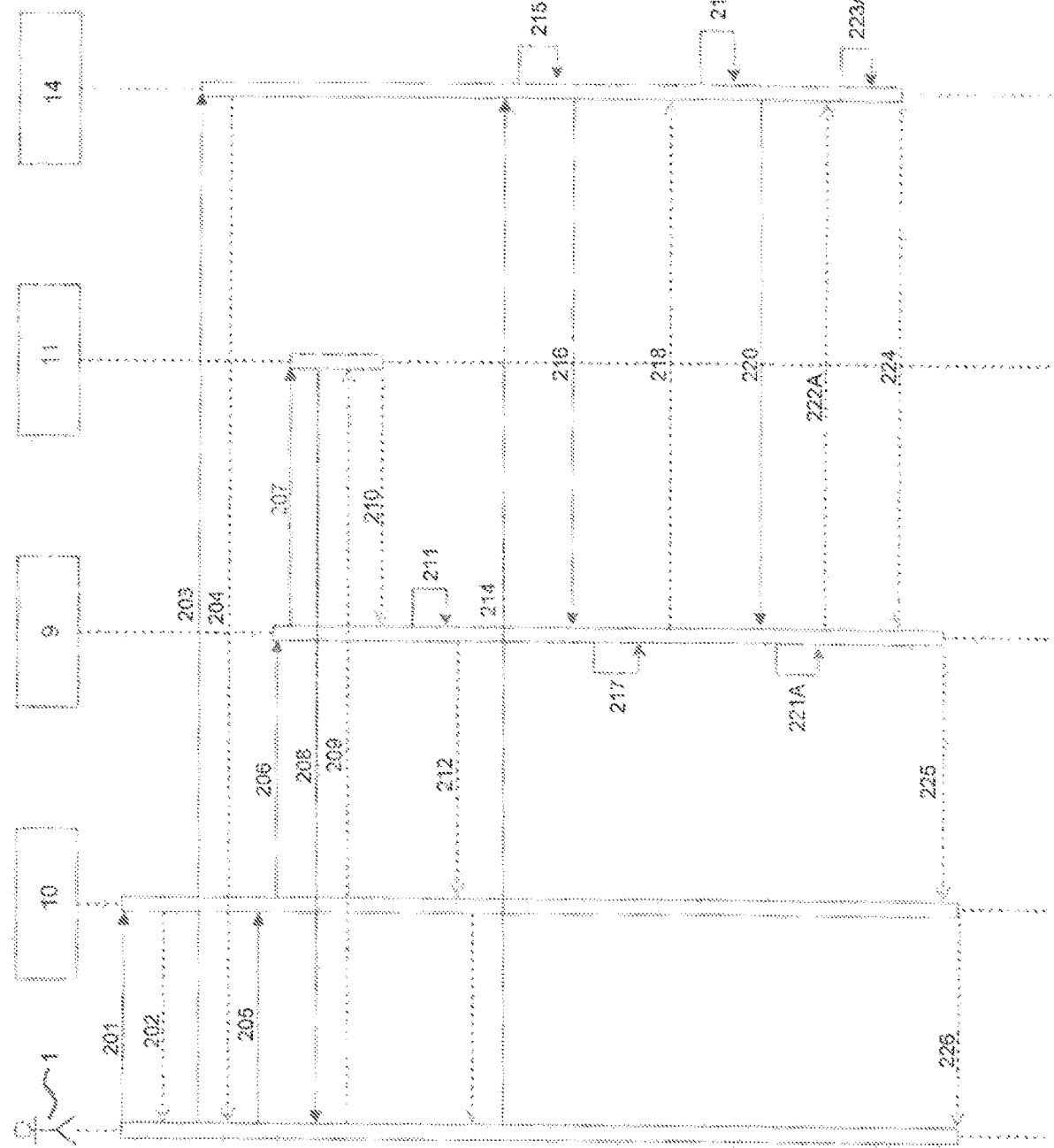
FIG. 5 shows a schematic diagram for a method for providing the electronic identity on the terminal using two public-key infrastructures.

FIG. 5 shows a schematic diagram for a method for providing the electronic identity on the terminal 2 using two PKIs $PKI^{2,1}$, $PKI_{2,2}$. Hereinafter the steps 221A to 223A modified with regard to the two PKIs $PKI_{2,1}$, $PKI_{2,2}$ for providing the electronic identity are explained. The remaining steps 201 to 220 as well as 224 to 226 for providing the electronic identity on the terminal 2 are carried out as when using a single PKI.

In step 221A the data processing device 9 of a network-based personalization service generates a certificate $Cert_{ID\_app}$ for the public key $pk_{ID\_app}$ and stores the certificate $Cert_{ID\_app}$ in the PKI $PKI_{2,1}$.

Furthermore, the data processing device 9 generates a logical data structure $LDS_2$ comprising hash values of each of the identity attributes $attr_{ID}$, the certificate $Cert_{ID\_app}$ as well as digital signatures of the hash values of the identity attributes and the certificate $Cert_{ID\_app}$ by means of a private key $sk_{Perso\_Ident}$. A public key $pk_{Perso\_Ident}$ corresponding to the private key $sk_{Perso\_Ident}$ is part of the certificate $Cert_{Perso\_Ident}$ of the personalization service and is published in the PKI $PKI_{2,2}$. Furthermore a digital signature of the logical data structure $LDS_2$ is generated by means of the private key $sk_{Perso\_Ident}$.

The logical data structure $LDS_2$, the certificates $Cert_{ID\_app}$ and $Cert_{perso\_Ident}$ as well as the identity attributes $attr_{ID}$ are then encrypted by the data processing device 9 in each case by means of the public key $pk_{ID\_app}$ to form an encrypted data structure $enc(LDS_2, pk_{ID\_app})$, encrypted certificates $enc(Cert_{ID\_app}, pk_{ID\_app})$ and $enc(Cert_{Perso\_Ident}, pk_{ID\_app})$ as well as encrypted identity attributes $enc(attr_{ID}, pk_{ID\_app})$.

In step 222A the encrypted data structure $enc(LDS_2, pk_{ID\_app})$, the encrypted certificates $enc(Cert_{ID\_app},$ $pk_{ID\_app})$ and $enc(Cert_{Perso\_Ident}, pk_{ID\_app})$ as well as the encrypted identity attributes $enc(attr_{ID}, pk_{ID\_app})$ are transmitted from the data processing device 9 back to the software application 14.

In step 223A the encrypted data structure $enc(LDS_2, pk_{ID\_app})$, as well as the encrypted certificates $enc(Cert_{ID\_app}, pk_{ID\_app})$ and $enc(Cert_{Perso\_Ident}, pk_{ID\_app})$ are decrypted by the software application 14 with the private key $sk_{Ip\_app}$ and stored in the data storage device 6 on the terminal 2. Furthermore, the software application 14 decrypts the encrypted identity attributes $enc(attr_{ID}, pk_{ID\_app})$ with the private key $sk_{ID\_app}$ and stores the decrypted identity attributes $attr_{ID}$ with a device-bound symmetrical key $key_{attr}$ on the data storage device 6 of the terminal 2.

The remaining steps 224 to 226 for providing the electronic identity on the terminal 2 are carried out as with a single PKI. FIG. 6 shows a schematic diagram for identification and/or authentication by means of the electronic identity with respect to an online service using the two PKIs $PKI_{2,1}$, $PKI_{2,2}$. Hereinafter the steps 306A to 310A modified with respect to the two PKIs $PKI_{2,1}$, $PKI_{2,2}$ for identification and authentication by means of the electronic identity are explained. The remaining steps 301 to 305 as well as 311 and 312 for providing the electronic identity on the terminal 2 are carried out as with a single PKI.

In step 306A the software application 14 analyzes the authentication request token $token_{auth\_request}$ and extracts information of the online service from the authentication request token $token_{auth\_request}$. By means of the extracted information of the online service, the software application 14 builds up a secure mutually authenticated connection to the data processing device 12 of the online service. At this point in particular the standard protocol sequence for the TLS with a client authentication before a server authentication can be used since the certificate $Cert_{ID\_app}$ does not contain any personal data and the hash values of the identity attributes $attr_{ID}$ are only found in the logical data structure $LDS_2$. Thus, the identity attributes $attr_{ID}$ cannot reach a non-authenticated server.

In step 307A the user 1 can accept the authentication request with the information extracted from the EV certificate $Cert_{EV\_service}$ via the service. The accepting of the authentication request by the user 1 can be accomplished, for example, in the input device 3 by means of biometric authentication (possibly by means of input of a fingerprint of the user 1) or by means of a predefined user PIN. When the user 1 accepts the authentication request, the logical data structure $LDS_2$ and the requested identity attributes $attr_{ID}$ are sent to the data processing device 12.

In step 308A the data processing device 12 sends a certificate validity request for the certificate $Cert_{ID\_app}$ to the PKI $PKI_{2,1}$ and a further certificate validity request for the certificate $Cert_{Perso\_Ident}$ to the PKI $PKI_{2,2}$.

In step 309A the data processing device 9 checks by means of the PKI $PKI_{2,1}$ the validity of the certificate $Cert_{ID\_app}$ and by means of PKI2,2 the validity of the certificate $Cert_{Perso\_Ident}$ and returns the results of the verification of the respective validity of the certificates $Cert_{ID\_app}$ and $Cert_{Perso\_Ident}$ to the data processing device 12.

In step 310A the data processing device 12 of the online service checks whether the sent identity attributes $attr_{ID}$ are valid. This check is made by calculating hash values from the identity attributes $attr_{ID}$ by means of a hash function and comparing the calculated hash values with the hash values of the identity attributes $attr_{ID}$ stored in the logical data structure $LDS_2$. Furthermore the data processing device 12 verifies the signature of the logical data structure $LDS_2$ and checks whether the certificate $Cert_{ID\_app}$ is contained in the logical data structure $LDS_2$.

If the calculated hash values agree with the hash values stored in the logical data structure $LDS_2$, the signature of the logical data structure $LDS_2$ is verified, the certificate $Cert_{ID\_app}$ is contained in the logical data structure $LDS_2$ and the certificate $Cert_{ID\_app}$ was validated, a URI is sent by the data processing device 12 to the software application 14. Otherwise, the process is interrupted.

The remaining steps 311 and 312 are carried out as with a single PKI.

FIG. 7 shows a schematic diagram for a method for providing the electronic identity on the terminal 2 using the three PKIs $PKI_{3,1}$, $PKI_{3,2}$, $PKI_{3,3}$. Hereinafter the steps 221B to 223B modified with respect to the three PKIs $PKI_{3,1}$, $PKI_{3,2}$, $PKI_{3,3}$ for providing the electronic identity are explained. The remaining steps 201 to 220 as well as 224 to 226 for providing the electronic identity on the terminal 2 are carried out as when using a single PKI.

In step 221B the data processing device 9 selects a key pair from private key $sk_{ID\_TLS\_client}$ and public key $pk_{ID\_TLS\_client}$. For the public key $pk_{ID\_TLS\_client}$ the data processing device 9 generates a certificate $Cert_{ID\_TLS\_client}$ and stores the certificate $Cert_{ID\_TLS\_client}$ in the PKI PKI3,1. The PKI PKI3,1 in this case does not contain the public key $pk_{ID\_app}$. Furthermore the data processing device 9 generates a certificate $Cert_{ID\_app}$ for the public key $pkt_{ID\_app}$ and stores the certificate $Cert_{ID\_app}$ in the PKI $PKI_{3,2}$.

In addition the data processing device 9 generates a logical data structure $LDS_3$ comprising hash values of each of the identity attributes $attr_{ID}$, the certificate $Cert_{ID\_app}$, the certificate $Cert_{ID\_TLS\_client}$ as well as digital signatures of the hash values of the identity attributes $attr_{ID}$, of the certificate $Cert_{ID\_app}$ and the certificate $Cert_{ID\_TLS\_client}$ by means of a private key $sk_{perso\_Ident}$. A public key $pk_{ID\_TLS\_client}$ corresponding to the private key $sk_{perso\_Ident}$ is part of a certificate $Cert_{Perso\_Ident}$ of the personal service and is published in the PKI $PKI_{3,3}$. Furthermore, a digital signature of the logical data structure $LDS_3$ is generated by means of the private key $sk_{perso\_Ident}$.

The logical data structure $LDS_3$, the certificates $Cert_{ID\_app}$, $Cert_{ID\_TLS\_client}$ and $Cert_{Perso\_Ident}$, the private key $sk_{ID\_TLS\_client}$ as well as the identity attributes $attr_{ID}$ are then encrypted by the data processing device 9 in each case by means of the public key $pk_{ID\_app}$ to form an encrypted data structure $enc(LDS_3, pk_{ID\_app})$, encrypted certificates $enc(Cert_{ID\_app}, pk_{ID\_app})$, $enc(Cert_{ID\_TLS\_client}, pk_{ID\_app})$ and $enc(Cert_{Perso\_Ident}, pk_{ID\_app})$, an encrypted private key $enc(pk_{ID\_TLS\_client}, Pk_{ID\_app})$ as well as encrypted identity attributes $enc(attr_{ID}, pk_{ID\_app})$.

In step 222B the encrypted data structure $enc(LDS_3, pk_{ID\_app})$, encrypted certificates $enc(Cert_{ID\_app}, pk_{ID\_app})$, $enc(Cert_{ID\_TLS\_client}, Pk_{ID\_app})$ and $enc(Cert_{Perso\_Ident}, pk_{ID\_app})$, the encrypted private key $enc(pk_{ID\_TLS\_client}, pk_{ID\_app})$ as well as the encrypted identity attributes $enc(attr_{ID}, pk_{ID\_app})$ are sent by the data processing device 9 back to the software application 14.

In step 223B the encrypted data structure $enc(LDS_3, pk_{ID\_app})$, the encrypted certificates $enc(Cert_{ID\_app}, pk_{ID\_app})$, $enc(Cert_{ID\_TLS\_client}, pk_{ID\_app})$ and $enc(Cert_{Perso\_Ident}, Pk_{ID\_app})$ are decrypted by the software application with the private key $sk_{ID\_app}$ and stored in the data storage device 6 on the terminal 2. Furthermore the software application 14 decrypts the encrypted identity attributes $enc(attr_{ID}, pk_{ID\_app})$ as well as the encrypted private key $enc(pk_{ID\_TLS\_client}, pk_{ID\_app})$ with the private key $sk_{ID\_app}$ and stores the identity attributes $attr_{ID}$ and the private key $sk_{ID\_TLS\_client}$ encrypted with a device-bound symmetrical key$_{attr}$ on the data storage device 6 of the terminal 2.

The remaining steps 224 to 226 for providing the electronic identity on the terminal 2 are carried out as with a single PKI.

FIG. 8 shows a schematic diagram for identification and/or authentication by means of the electronic identity with respect to an online service using the three PKIs $PKI_{3,1}$, $PKI_{3,2}$, $PKI_{3,3}$. Hereinafter the steps 301B to 312B modified with respect to the three PKIs $PKI_{3,1}$, $PKI_{3,2}$, $PKI_{3,3}$ for identification and authentication by means of the electronic identity are explained.

In step 301B the user 1 clicks in an own web browser 15B (in-app browser) of the software application 14 on a control on the website of the online service. The web browser 15B then sends a login request to the data processing device 12 of the online service via a communication channel which has been mutually authenticated and secured with TLS and the certificate $Cert_{ID\_TLS\_client}$ (step 302B). The mutual authentication of the secure communication channel is a particular feature of the use of three PKIs. The login request contains a session identifier $ID_{session}$. The identity of the online service is verified by an EV certificate $Cert_{EV\_service}$.

The steps 303B to 305B take place similarly to the steps 303 to 305 but using the web browser 15B of the software application 14 instead of the web browser 15.

In step 306B the software application 14 analyzes the authentication request token $token_{auth\_request}$ and extracts from the authentication request token $token_{auth\_request}$ information of the online service. By means of the extracted information of the online service, the software application 14 constructs a secure, mutually authenticated connection to the data processing device 12 of the online service. At this point in particular the standard protocol sequence for TLS with a client authentication can be used before a server authentication since the certificate $Cert_{ID\_app}$ contains no personal data and the hash values of the identity attributes $attr_{ID}$ are only found in the logical data structure $LDS_2$. Thus the identity attributes $attr_{ID}$ cannot reach a non-authenticated server.

In step 307B with the information extracted from the EV certificate $Cert_{EV\_service}$ via the service, the user 1 can accept the authentication request. The accepting of the authentication request by the user 1 can be accomplished, for example, in the input device 3 by means of biometric authentication (possibly by means of input of a fingerprint of the user 1) or by means of a predefined user PIN. When the user 1 accepts the authentication request, the logical data structure $LDS_3$ and the requested identity attributes $attr_{ID}$ are sent to the data processing device 12.

In step 308B the data processing device 12 of the online service then sends a certificate validity request for the certificate $Cert_{ID\_app}$ to the PKI $PKI_{3,1}$ of the personalization service, a certificate validity request for the certificate $Cert_{Perso\_ident}$ to the PKI $PKI_{3,2}$ and a certificate validity request for the certificate $Cert_{ID\_TLS\_client}$ to the PKI $PKI_{3,3}$.

In step 309B the data processing device 9 checks by means of the PKIs $PKI_{3,1}$, $PKI_{3,2}$ and/or $PKI_{3,3}$ the validity of the certificates $Cert_{ID\_app}$, $Cert_{Perso\_ident}$ and/or $Cert_{ID\_TLS\_client}$ and returns results of the verification of the respective validity of the certificates $Cert_{ID\_app}$, $Cert_{Perso\_ident}$ and $Cert_{ID\_TTS\_client}$ to the data processing device 12.

In step 310B the data processing device 12 of the online service checks whether the sent identity attributes $attr_{ID}$ are valid. This check is made by calculating hash values from the identity attributes $attr_{ID}$ by means of a hash function and comparing the calculated hash values with the hash values of the identity attributes $attr_{ID}$ stored in the logical data structure $LDS_3$. Furthermore the data processing device 12 verifies the signature of the logical data structure $LDS_3$ and checks whether the certificates $Cert_{ID\_app}$ and $Cert_{ID\_TLS\_client}$ are contained in the logical data structure $LDS_3$.

If the calculated hash values agree with the hash values stored in the logical data structure $LDS_3$, the signature of the logical data structure $LDS_3$ is verified, the certificates $Cert_{ID\_app}$ and $Cert_{ID\_TLS\_client}$ are contained in the logical data structure $LDS_3$ and the certificates $Cert_{ID\_app}$ and $Cert_{ID\_TLS\_client}$ have been validated, a URI is sent by the data processing device 12 to the software application 14. Otherwise the process is interrupted.

If the URI was sent from the data processing device 12 to the software application 14, the software application 14 transfers the URI together with the session identifier $ID_{session}$ to the web browser 15B (step 311B). The web browser 15 then loads the received URI (step 312B). Thus, the identification and authentication by means of the electronic identity using three PKIs $PKI_{3,1}$, $PKI_{3,2}$, $PKI_{3,3}$ is completed.

The features disclosed in the preceding description, the claims and the drawing can be important both individually and also in any combination for the implementation of the various embodiments.

The invention claimed is:

1. Method for securely providing a personalized electronic identity on a terminal which can be used by a user for identification purposes when claiming an online service, wherein in the method in a system comprising data processing devices and a terminal which is assigned to a user, an identification application is executed on the terminal and furthermore a personalization application and an identity provider application are executed and wherein the method here comprises the following:
   transmitting a request to transmit an identity attribute assigned to the user from the personalization application to the identity provider application;
   transmitting the identity attribute from the identity provider application to the personalization application after an agreement to transmit the identity attribute by means of the identity provider application was received from the user;
   generating an asymmetric key pair with a public and a private key on the terminal by means of the identification application in response to the receipt of a request to generate the asymmetric key pair in the terminal from the personalization application;
   transmitting the public key from the identification application on the terminal to the personalization application;
   generating an electronic certificate for the public key by means of the personalization application and storing the electronic certificate to form a first public-key infrastructure of the personalization application in a data storage device, further comprising:
      generating a hash value for the identity attribute and recording the hash value onto the electronic certificate;
   encrypting the identity attribute with the public key by the personalization application,
   transmitting the encrypted identity attribute and the electronic certificate from the personalization application to the identification application on the terminal and
   decrypting the encrypted identity attribute with the private key and storing the decrypted identity attribute and the electronic certificate as personalized electronic identity of the user in a local storage device of the terminal.

2. Method according to claim 1, wherein the asymmetric key pair is generated in the terminal as a device-related asymmetric key pair.

3. Method according to claim 1, wherein the identification application is executed at least partially in a further terminal.

4. Method according to claim 1, wherein:
   encrypting the electronic certificate with the public key by the personalization application;
   transmitting the encrypted electronic certificate from the personalization application to the identification application on the terminal and
   decrypting the encrypted electronic certificate with the private key.

5. Method according to claim 1, wherein report information is generated and transmitted, wherein the following is provided:
   generating first report data by means of the identification application on the terminal which indicate on the storage of the electronic certificate, the provision of the personalized electronic identity in the terminal; and
   transmitting the first report data to the personalization application.

6. Method according to claim 1, where the electronic certificate is generated as an electronic certificate according to the X.509 standard.

7. Method according to claim 1, wherein the electronic certificate and the identity attribute is used as personalized electronic identity for an identification of the user with respect to an online service provider, wherein the following is provided here:
   provision of a service provider application on one of the data processing devices of the system;
   forming a data communication connection between the identification application on the terminal and the service provider application in response to the receipt of a request to use an online service provided via the service provider application by the service provider application;
   transmitting the electronic certificate with the included hash value for the identity attribute as well as the identity attribute from the identification application to the service provider application;
   verifying the electronic certificate for validity by the personalization application after receipt of the electronic certificate from the service provider application;
   calculating a comparison hash value for the identity attribute obtained from the identification application by the service provider application and comparing the comparison hash value with the hash value for the identity attribute from the electronic certificate and
   releasing the online service for the user when the electronic certificate is verified as valid and the comparison hash value corresponds to the hash value.

8. Method according to claim 7, characterized in that the data communication connection is configured as a mutually authenticated data communication connection.

9. Method according to claim 1, wherein for the provision and for the configuration of the identification application on the terminal the following is provided:
   installing the identification application on the terminal;
   starting the identification application (14) in response to a user start input;

forming a secure data communication connection between the identification application on the terminal and the personalization application on a first data processing device;

generating a further asymmetric key pair by the identification application in the terminal;

transmitting the further public key and a device identifier from the identification application on the terminal to the personalization application and generating a preliminary electronic certificate for the further public key which contains the device identifier by the personalization application in the first data processing device.

\* \* \* \* \*